(12) United States Patent
Seiwert et al.

(10) Patent No.: US 7,731,161 B2
(45) Date of Patent: Jun. 8, 2010

(54) DEVICES, SYSTEMS, AND METHODS FOR CARBONATION OF DEIONIZED WATER

(75) Inventors: Johannes Seiwert, Berlin (DE); Ulrich Brammer, Berlin (DE); Christiane Gottschalk, Berlin (DE); Joachim Lohr, Berlin (DE)

(73) Assignee: MKS Instruments, Inc., Andover, MA (US)

( * ) Notice: Subject to any disclaimer, the term of this patent is extended or adjusted under 35 U.S.C. 154(b) by 210 days.

(21) Appl. No.: 11/873,776

(22) Filed: Oct. 17, 2007

(65) Prior Publication Data

US 2008/0257738 A1 Oct. 23, 2008

Related U.S. Application Data

(60) Provisional application No. 60/852,265, filed on Oct. 17, 2006.

(51) Int. Cl.
*B01F 3/04* (2006.01)

(52) U.S. Cl. ............... 261/26; 261/64.1; 261/66; 261/DIG. 7

(58) Field of Classification Search ............ 261/26, 261/64.1, 66, 94, DIG. 7; 210/746
See application file for complete search history.

(56) References Cited

U.S. PATENT DOCUMENTS

| | | | |
|---|---|---|---|
| 4,173,178 A * | 11/1979 | Wieland | 99/323.1 |
| 4,517,135 A * | 5/1985 | Szerenyi et al. | 261/104 |
| 5,175,124 A | 12/1992 | Winebarger | 437/180 |
| 5,264,025 A * | 11/1993 | Asai et al. | 95/263 |
| 5,336,371 A | 8/1994 | Chung et al. | 156/659.1 |
| 6,158,721 A * | 12/2000 | Katou et al. | 261/26 |
| 6,890,864 B2 | 5/2005 | Aoki et al. | 438/745 |
| 7,022,610 B2 | 4/2006 | Chou et al. | 438/704 |
| 2003/0006513 A1* | 1/2003 | Gotoh et al. | 261/122.1 |
| 2003/0168754 A1* | 9/2003 | Spiegel et al. | 261/94 |
| 2005/0133066 A1 | 6/2005 | Takahashi | 134/25.4 |

FOREIGN PATENT DOCUMENTS

| | | | |
|---|---|---|---|
| GB | 2343637 | 5/2000 | |
| JP | 59173184 | 10/1984 | |
| JP | 60000876 | 1/1985 | |
| JP | 63274488 | 11/1988 | |
| JP | 2-279158 A * | 11/1990 | 261/DIG. 7 |
| JP | 10202242 | 8/1998 | |
| JP | 10223592 | 8/1998 | |
| JP | 2000354729 | 12/2000 | |
| JP | 2006012966 | 1/2006 | |
| KR | 20020093397 | 12/2002 | |

* cited by examiner

*Primary Examiner*—Richard L Chiesa
(74) *Attorney, Agent, or Firm*—Proskauer Rose LLP (57) ABSTRACT

Devices, systems, and methods employed in wet cleaning semiconductor devices are provided. In particular, systems that can deliver deionized water with the desired concentration of CO2 and methods of generating deionized water with a desired concentration of CO2 for use in wet cleaning of semiconductor devices are provided.

22 Claims, 10 Drawing Sheets

DEVICES, SYSTEMS, AND METHODS FOR CARBONATION OF DEIONIZED WATER

CROSS-REFERENCE TO RELATED APPLICATIONS

This application claims the benefits of and priority to U.S. provisional patent application Ser. No. 60/852,265 filed on Oct. 17, 2006, the entire disclosure of which is herein incorporated by reference.

FIELD OF THE INVENTION

In general, the invention relates to devices, systems, and methods employed in wet cleaning semiconductor devices. In particular, the invention relates to systems that can deliver deionized water with the desired concentration of CO2 and methods of generating deionized water with a desired concentration of CO2 for use in wet cleaning of semiconductor devices.

BACKGROUND OF THE INVENTION

Microelectronics chips such as integrated circuits are made from comparatively large wafers of semiconductor material. This process typically involves multiple successive steps including the following: generation of an etch mask photolithographically; etching of a layer of material as defined by the mask; removal of the photolithographic mask through some combination of wet and dry chemical techniques; and deposition of layers of materials. The photolithographic mask is formed from a polymeric material called a photoresist. After the photoresist mask has been removed, a final cleaning step, called rinsing or wet cleaning, is typically performed.

Deionized (DI) water is known for its use in this rinsing of semiconductor devices. It is known to prevent any metal corrosion and contamination of the devices. In order to make the wet cleaning more effective, gases such as carbon dioxide (CO2) and nitrogen (N2) have often been mixed with the DI water. Rinsing with carbonated deionized (DI-CO2) water is an electrically inert process that allows for damage free cleaning while maintaining the device integrity.

Controlling the proportions of these gases require considerably complex instrumentation and high costs which are significant disadvantages of current methods. Typically, an excess of gas is used which can lead to toxicity and disposal problems with respect to the unused gases particularly carbon dioxide. As a result, these processes are expensive and cumbersome.

SUMMARY OF THE INVENTION

In one aspect, the invention features a system for carbonation of deionized water. The system includes a deionized water source, a carbon dioxide gas source, a contactor, at least one sensor, and a feed-forward loop. The contactor can be in fluid communication with the water source and the gas source. The contactor can generate carbonated deionized (DI-CO2) water and can have an outlet for outputting the carbonated deionized water. The at least one sensor can be in fluid communication with the outlet for measuring parameters of the carbonated deionized water. The feed-forward loop can be in communication with the sensor for adjusting conductivity of the carbonated deionized water generated in the contactor.

In another aspect, the invention features a method of generating carbonated deionized water. The method includes supplying deionized water and carbon dioxide gas to a contactor. The parameters of the carbonated deionized water generated in the contactor and exiting via a contactor outlet can be sensed with at least one sensor. The conductivity of the carbonated deionized water can be controlled based on the sensed parameters. The conductivity of the carbonated deionized water can be adjusted with a feed-forward loop. The carbonated deionized water of a specified conductivity can be flowed from the contactor.

In various examples, any of the aspects above or any of the methods or systems or modules described herein, can include one or more of the following features. In some embodiments, the system can include at least one mass flow controller (MFC) in fluid communication with the gas source and the contactor. The at least one mass flow controller can be used to control the amount and flow rate of carbon dioxide gas entering the contactor.

In some embodiments, the system can include a feedback loop in communication with the at least one sensor and the at least one mass flow controller. The feedback loop can be used to adjust the amount of carbon dioxide gas to achieve a specified conductivity of the carbonated deionized water.

In certain embodiments, the system can include at least four mass flow controllers. In various embodiments, the system can include at least three sensors. In some embodiments, the system can include a processor for receiving the parameters from the at least one sensor. The parameters can include flow rate, temperature and conductivity of the carbonated deionized water. In certain embodiments, the system can include a by-pass unit in fluid communication with the deionized water source, the contactor and the at least one sensor.

In various embodiments, the method can include controlling flow rate and amount of carbon dioxide gas entering the contactor with at least one mass flow controller. In some embodiments, the method can include controlling the conductivity of the carbonated deionized water with a feedback loop. The feedback loop can be in communication with the at least one sensor and the at least one mass flow controller.

In various embodiments, the method can include adjusting at least four mass flow controllers. In some embodiments, the method can include sensing with at least three sensors. In certain embodiments, the method can include adjusting the conductivity of the carbonated deionized water with a by-pass unit.

In some embodiments, the method can include adjusting the conductivity of the carbonated deionized water based on the parameters received by a processor. In certain embodiments, the method can include mixing carbon dioxide gas with the deionized water prior to supplying the deionized water to the contactor.

In various embodiments, the conductivity of the carbonated deionized water exiting the contactor can be in the range of about 0-52 uS/cm. In some embodiments, the conductivity of the carbonated deionized water exiting the contactor can be in the range of about 2-50 uS/cm.

In some embodiments, the response time to change from one specified conductivity to another can be less than about 10 minutes. In various embodiments, the response time to change from one specified conductivity to another can be less than about 5 minutes. In certain embodiments, the response time can be less than about 1 minute. In various embodiments, the response time can be less than about 10 seconds.

One advantage of the present invention is the generation of "bubble free" DI-CO2 water. The contactor can provide a high surface area for thorough mixing of the CO2 gas with the DI water such that no excess carbon dioxide remains undissolved. This prevents the formation of bubbles in the DI-CO2 water. "Bubble free" DI water is advantageous for use in wet cleaning applications of semiconductor devices because it eliminates pockets of higher or lower acidity typically caused by bubbles. The "Bubble free" DI-CO2 water generated causes minimum damage to the devices being cleaned.

The conductivity of the DI-CO2 water is proportional to the concentration of the dissolved CO2 gas in the DI water. An advantage of the present invention is that it provides DI-CO2 water with a highly accurate CO2 concentration control. This is typically obtained due to the feed-forward loop mechanism in the system. The feed-forward loop mechanism can co-ordinate the parameters such as conductivity, temperature and flow rate of the DI-CO2 water exiting the contactor with the amount of carbon dioxide gas entering the contactor. The mass flow controllers and the feedback loop mechanism can provide additional control over the conductivity of the DI-CO2 water exiting the contactor. The feedback and feed-forward loop mechanisms also result in significantly reduced response times when the concentration of carbon dioxide in the DI water needs to be changed. In certain embodiments, the response time can be reduced to <1 minute. The response time is typically measured as the time to swing the conductivity of the DI-CO2 water from one value to another such as, for example, 2 uS/cm to 50 uS/cm and back.

Another advantage of the present invention is that it eliminates the need for nitrogen gas thereby reducing the cost, size and complexity of the system and providing a much simpler alternative for obtaining DI-CO2 water. A further advantage of the present invention is that nearly all the carbon dioxide entering the contactor is consumed thereby eliminating the issues related to disposal or toxicity of unused excess gas.

Another advantage of the present invention is that it leads to a reduction in the DI water pressure drop from >0.8 bar in known systems to <0.3 bar. The pressure drops typically occur either at the beginning of a new cycle when the DI water needs to be purged, or during sudden and unanticipated changes in the conductivity if one or more valves or regulators develop a leak or other malfunction. The present invention allows for a greater reliability with faster response times at a lower cost.

Other aspects and advantages of the invention will become apparent from the following drawings, detailed description, and claims, all of which illustrate the principles of the invention, by way of example only.

BRIEF DESCRIPTION OF DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

The present invention provides devices, systems, and methods of making DI-CO2 water for wet cleaning of semiconductor devices. In general, the devices, systems, and methods provide wet cleaning of semiconductor devices while preventing or reducing damage created by electrostatic charge. In one aspect, the invention provides a device with a high level of control and consistency over a desired concentration of carbon dioxide in the DI-CO2 water. In another aspect, the devices, systems and methods can be used to generate DI-CO2 water containing a large range of different CO2 concentrations. For example, the devices, systems and methods can generate low CO2 concentration DI-CO2 water (0.154 mg/L CO2) as well as high CO2 concentration DI-CO2 water (1540 mg/L). In general, the devices, systems, and methods of the present invention eliminate a need for adding excess CO2 gas, nitrogen gas, or any other gas to a contactor for the DI-CO2 generation, thereby reducing the cost, size and complexity of the devices, systems, and methods. Most, if not all, of the carbon dioxide gas utilized in the devices, systems, and methods gets dissolved in the DI water. As a result, disposal and toxicity issues are reduced over conventional systems which typically use excess CO2 gas.

Figure 1:
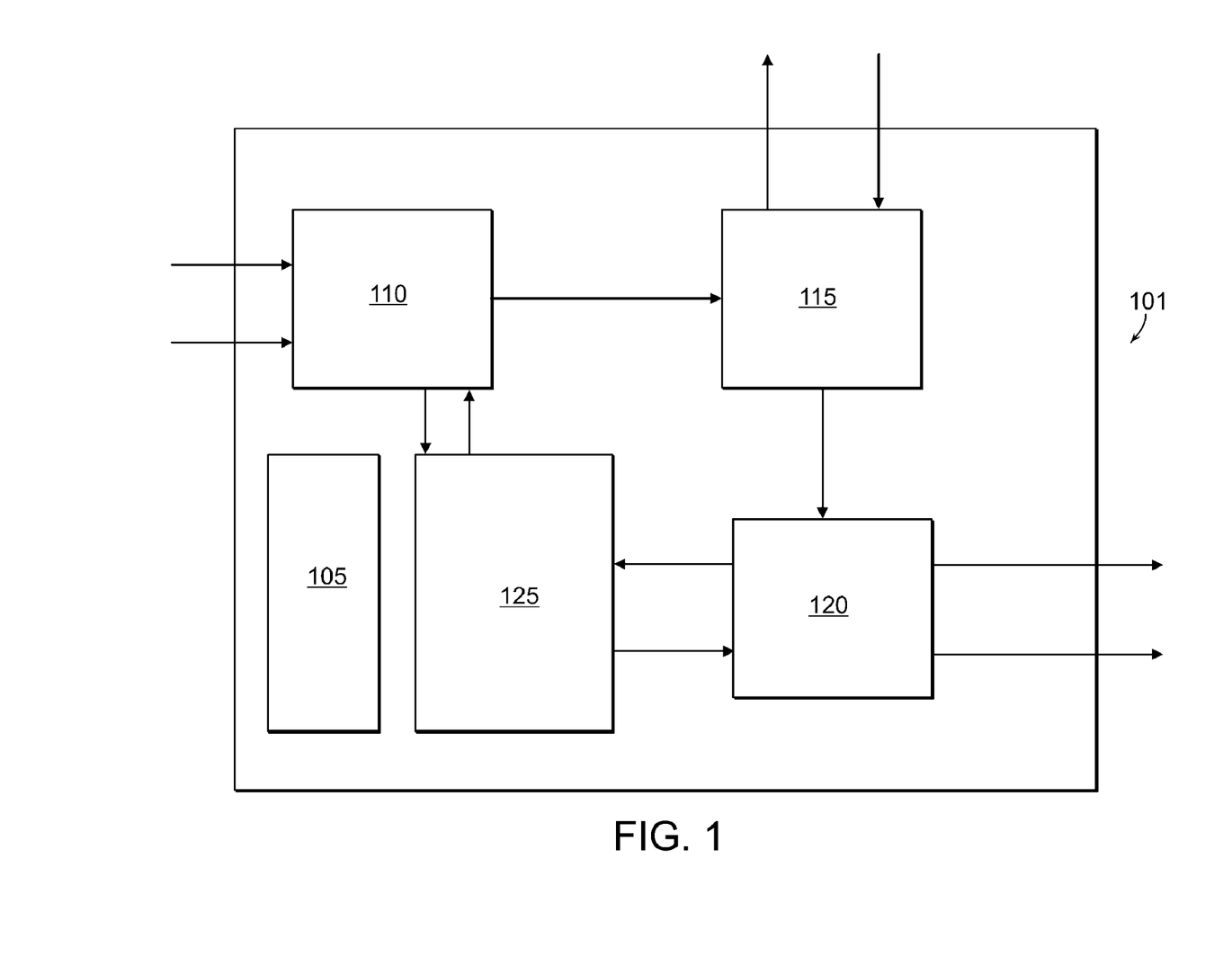
FIG. 1 is a block diagram of a first embodiment of the system for generating DI-CO2 water.

FIG. 1 shows an embodiment of a system used to carbonate ultra-pure DI water (i.e., add CO2 to the DI water). System 101 typically includes a source of electrical power supply 105, a gas module 110, a contactor 115, and a sensor module 120. System 101 can also include a control module 125.

The gas module 110 can be connected to one or more sources of gases such as CO2 and Nitrogen. Gas module 110 can include a plurality of variable valves, filters and mass flow controllers to monitor and/or control the flow rate and amount of each gas entering and exiting the gas module 110. The gases can exit the gas module 110 separately or can be pre-mixed before exiting. Upon exiting the gas module 110, the gases can be delivered to contactor 115.

Contactor 115 typically includes at least one inlet for the gases, at least one inlet for DI water, at least one outlet to release excess gas and at least one outlet to release DI-CO2 water. The gases can be injected, or purged into the contactor 115. The contactor 115 can be pressurized or evacuated if desired. The contactor 115 typically allows for generation of bubble free DI-CO2 water.

The DI-CO2 water can be released from contactor 115 and passed through sensor module 120. Sensor module 120 can include a plurality of sensors to monitor and/or control a plurality of parameters of the DI-CO2 water. Such parameters can include flow-rate, conductivity, temperature and pressure of the DI-CO2 water. The DI-CO2 water can be drained out of the sensor module 120 to be used as required or can be redirected back into the system if necessary.

System 101 can include a control module 125 in fluid communication with sensor module 120 and gas module 110. Control module 125 can include a processor, a keypad and a display. The processor can be for example, a microprocessor of a computer. Control module can allow automatic control and/or monitoring of each valve, mass flow controller and sensor in system 101. Each valve, mass flow controller and sensor in system 101 can also be controlled manually.

Figure 2:
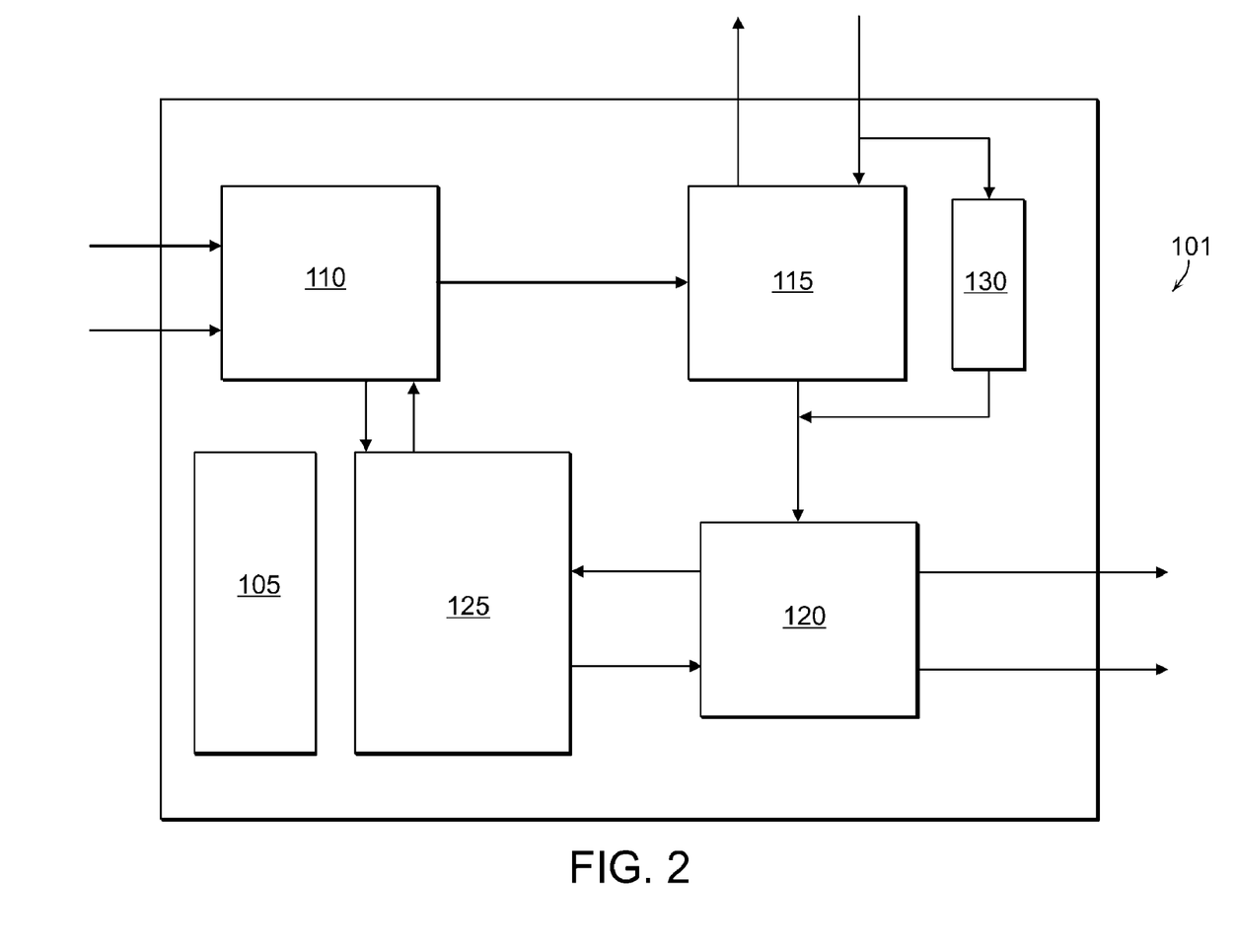
FIG. 2 is a block diagram of a second embodiment of the system for generating DI-CO2 water.

FIG. 2 shows another embodiment of system 101. System 101 can include a by-pass unit 130 in addition to contactor 115. By-pass unit 130 can include a plurality of valves and sensors to monitor and/or control the parameters of DI water passing through the unit. The valves and sensors can be operated manually or controlled by the control module 125. One advantage of by-pass unit 130 is that it allows for a high volume of DI water to by-pass contactor 115 and mix with the DI-CO2 water being released from contactor 115. Another advantage of by-pass unit 130 is that it can shorten the response time required to go from high conductivity-low flow to low conductivity-high flow of the DI-CO2 water and vice versa.

Figure 3:
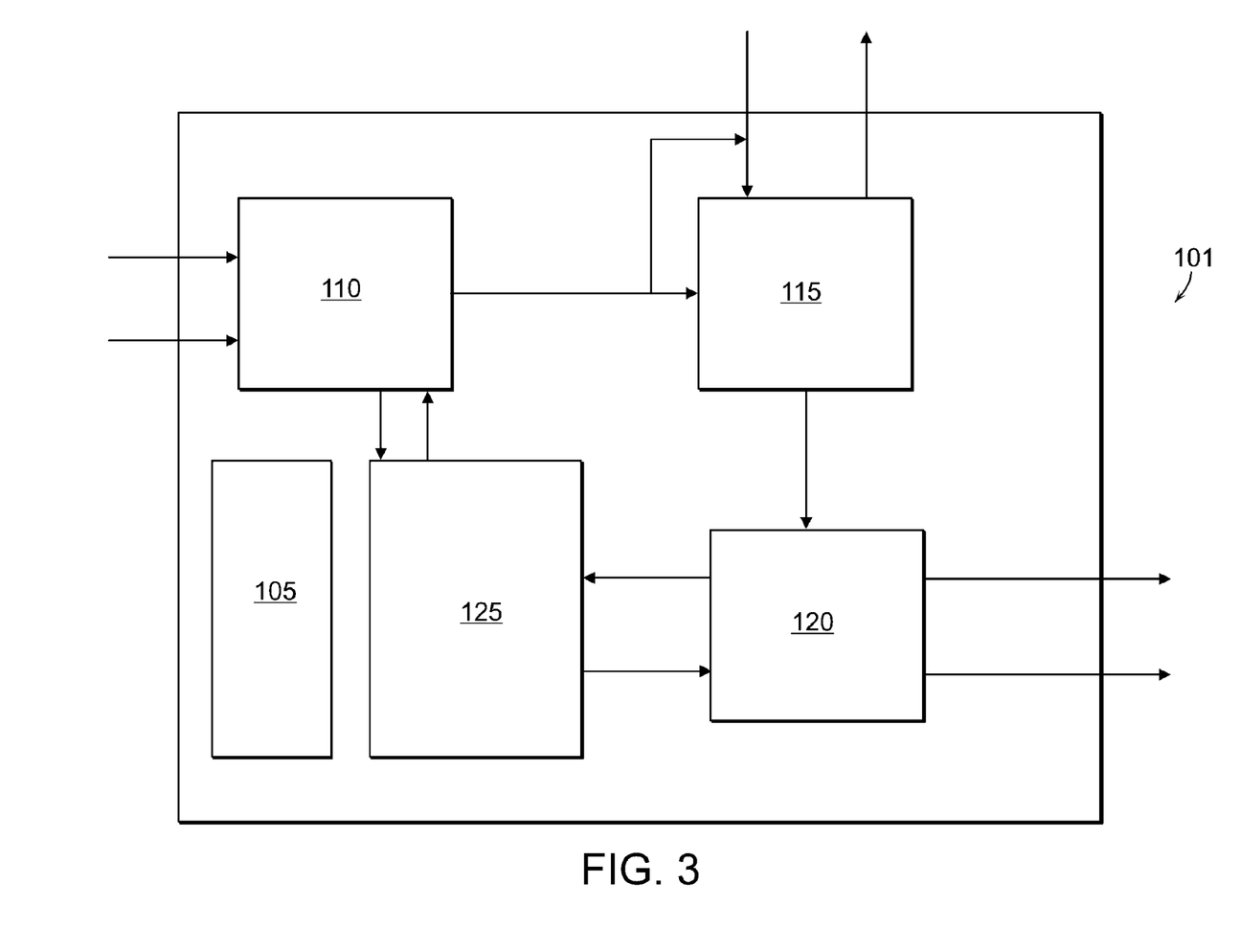
FIG. 3 is a block diagram of a third embodiment of the system for generating DI-CO2 water.

FIG. 3 shows another embodiment of system 101. The gases exiting the gas module can directly enter the contactor 115 or can be mixed with the DI water prior to entering contactor 115. An advantage of this embodiment is that it can reduce the response time required to go from high conductivity-low flow to low conductivity-high flow of the DI-CO2 water and vice versa.

Figure 4:
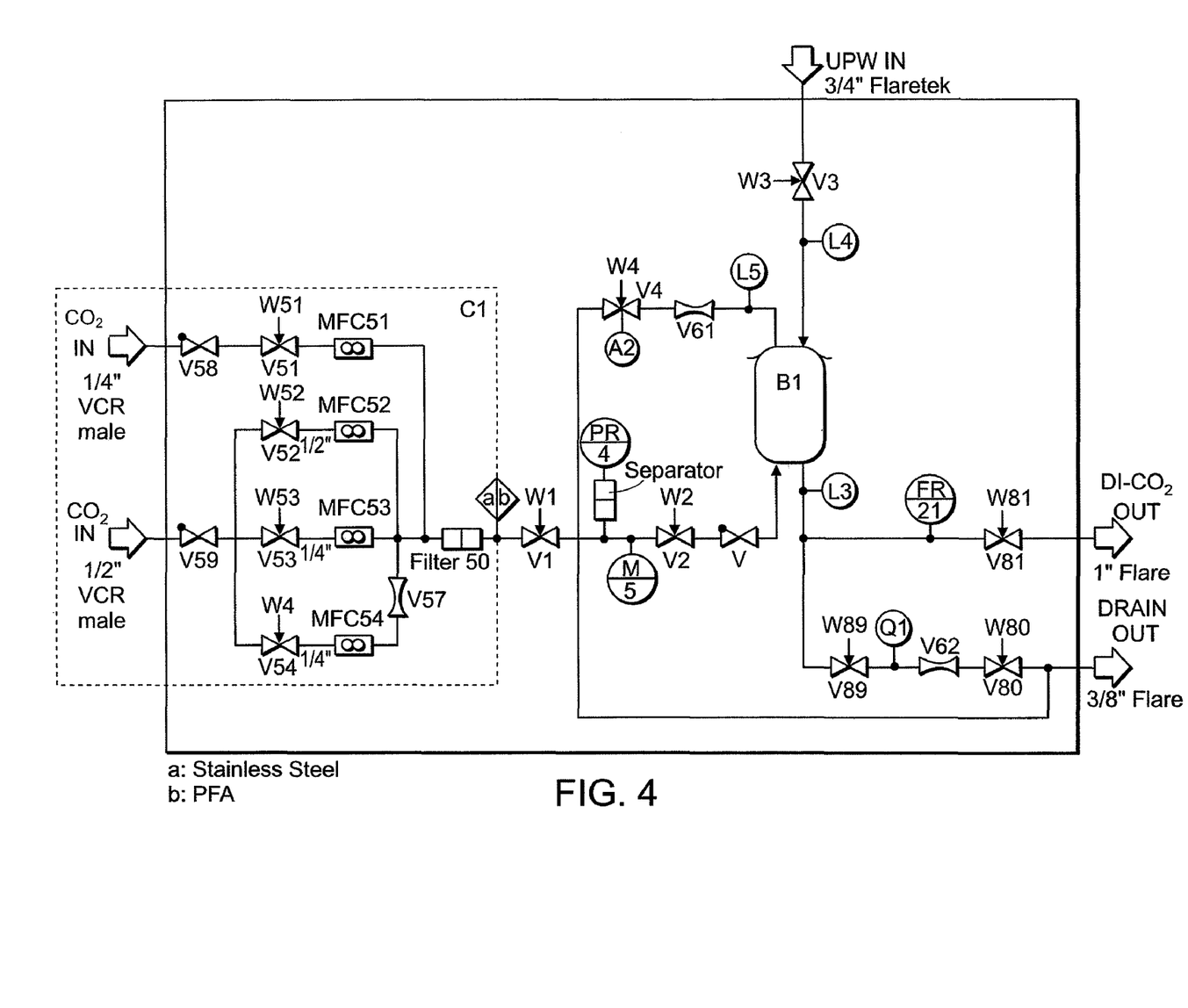
FIG. 4 is a detailed block diagram of an embodiment of the system for generating DI-CO2 water.

FIG. 4 shows an exemplary embodiment of a device used to carbonate ultra-pure DI water (i.e., add CO2 to the DI water). The device includes a gas module C1 in fluid communication with a contactor B1. The gas module C1 includes two inlets for gases, variable valves V51-V54, V58, and V59, and four mass flow controllers MFC 51-MFC54. Gas module C1 also includes a feedback loop/mechanism where MFC52-MFC54 are mutually connected via V57.

A feedback loop/mechanism can allow for correction of the parameters of gases exiting gas module C1. For example, in the embodiment shown in FIG. 4, one or more of the MFCs may slightly degrade or deviate from their initial flow rate calibration. To correct these deviations, a feedback loop can be included within the gas module C1 so as to update control mechanisms of the MFCs overtime.

The MFCs can be either adjusted manually or automatically. The MFCs control the gas flow to such an extent that most if not all of the carbon dioxide entering B1 gets dissolved in the DI water and therefore the resulting DI-CO2 water is "bubble free." This prevents uneven concentrations that may lead to poor cleaning properties. While FIG. 4 illustrates a gas module with four MFCs, any number of MFC units can be utilized. In certain embodiments other flow controllers or concentration metering devices may be used in place of or in addition to the MFCs to control the gas flow in gas module C1.

As shown in FIG. 4, DI water can enter the contactor B1 via V3 and gases from gas module C1 can enter via V1 and V2. Light barriers L3-L5 can be used to prevent gases from entering into the DI water line. In the contactor B1, carbon dioxide is mixed with the DI water until a desired amount of CO2 concentration is achieved. The DI-CO2 water is removed from B1 through an outlet DI-CO2 out via light barrier L3, sensor FR21 and valve V81. A sensor Q1 is connected in parallel to the DI-CO2 outlet. That is, a portion of the DI-CO2 water from the contactor can travel through a drain line that includes the sensor Q1 and valves V89, V62, V80. The sensor module includes sensors FR21 and Q1. Sensor FR21 monitors/controls the flow rate and sensor Q1 monitors/controls the temperature and conductivity of the DI-CO2 water. The sensor Q1, valves V89, V62, and V80 together with valves V4, V61 and light barrier L5 form a control loop which allows for purging/venting of the contactor B1. Q1 and FR21 can also be in communication with the mass flow controllers MFC51-MFC54 either directly or via a control module forming a feed-forward loop/mechanism.

The feed-forward mechanism allows the parameters of gases to be adjusted (for e.g., by changing the flow rate on one or more of the MFC) based upon the measurements taken at the sensor Q1 and the sensor FR21 and a desired CO2 set point. Sensor Q1 typically contains a metal electrode which can be kept in direct contact with the water flowing through it. The information gathered in the sensor module is relayed to the control module to adjust the amount of gases released from gas module C1. The control module can also allow for purging of the contactor B1. In certain embodiments, the control module further controls the feedback mechanism to adjust/correct deviations from initially calibrated values of the parameters set in gas module C1.

The feed-forward mechanism can control the CO2 concentration in the DI-CO2 water by monitoring parameters such as the temperature, flow rate and conductivity. For example, an operator of the device can use the control module to enter/select in a computer/microprocessor, a desired CO2 set point for the outflow concentration of CO2 or conductivity of the DI water. Higher concentrations of CO2 in the DI water call for utilization of greater CO2 flow rates into the contactor B1 and result in a more acidic solution (e.g., pH of 4.5 or less); lower concentrations of CO2 in the DI water use a lower CO2 flow rate (less CO2 gas) and result in a less acidic solution (e.g., pH of 4.6 or greater). To control the output from the contactor B1, the system can utilize the feed-forward mechanism in which the temperature, flow rate and conductivity values of the outflow are measured and electronically sent to the control module for a determination of an input CO2 concentration (e.g., flow rate) from the gas module C1.

In addition to controlling the gas module C1, the feed-forward mechanism can also be involved in purging or venting the system. For example, during start up or when the CO2 set point is drastically changed resulting in a much lower input of CO2 from C1, a purge vent can be opened to vent excess gas (e.g., oxygen/air at start up and excess CO2 at a set point change). Purging of the contactor B1 can be controlled automatically through the control system. In various embodiments the purge of the contactor B1 can be controlled manually by the operator opening a purge vent.

Figure 5:
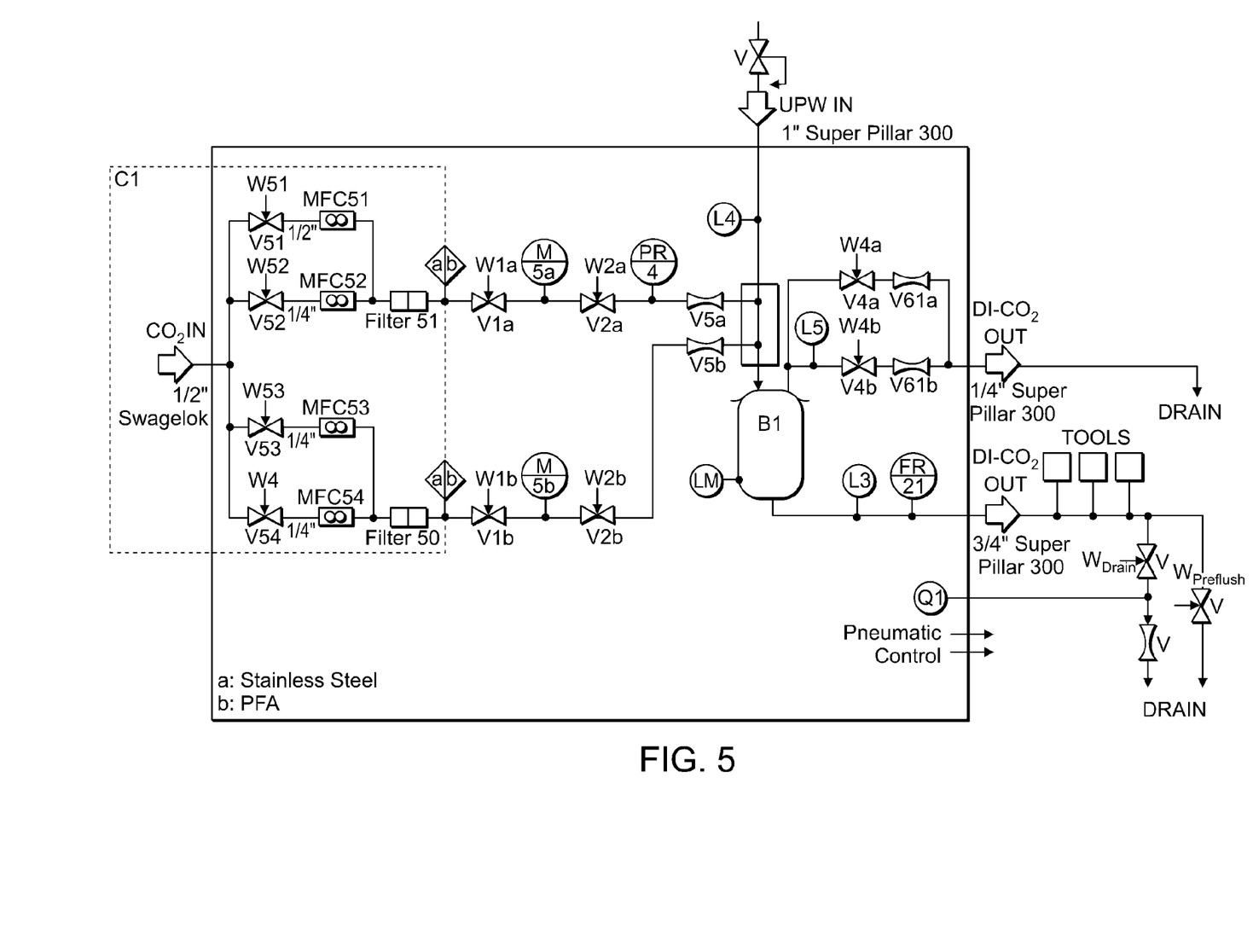
FIG. 5 is a detailed block diagram of another embodiment of the system for generating DI-CO2 water.

FIG. 5 shows another exemplary embodiment of a device used to generate DI-CO2 water. In this embodiment, gas module C1 includes one gas inlet in fluid communication with 4 variable valves V51-V54, 4 MFCs MFC51-MFC54 and two gas filters 50 and 51. As shown in FIG. 5, two separate loops can be formed containing two MFCs each and resulting in two separate gas outlets. Each of the two separate outlets can deliver the gas to the DI water prior to entering the contactor. Each delivery path can include a plurality of valves such as V1a, V1b, V2a, V2b, V5a and V5b. Each delivery path can also include a plurality of sensors such as M5a, M5b, and PR4. The sensors can be used to monitor and/or control parameters such as flow rate or pressure of the gases passing through the system. In certain embodiments, one outlet can direct the gas into the DI-water before it enters the contactor and the other outlet can direct the gas into the contactor. An advantage of mixing the CO2 gas and DI water prior to entering the contactor is a shorter response time to change from one conductivity of the DI-CO2 water to another. Another advantage is the accuracy of the concentration of CO2 in the DI-CO2 water and the conductivity of the DI-CO2 water exiting the contactor. The two separate loops in the gas module C1 provide an additional feedback mechanism to allow more control of the parameters of the gas entering and exiting the gas module C1.

Figure 6:
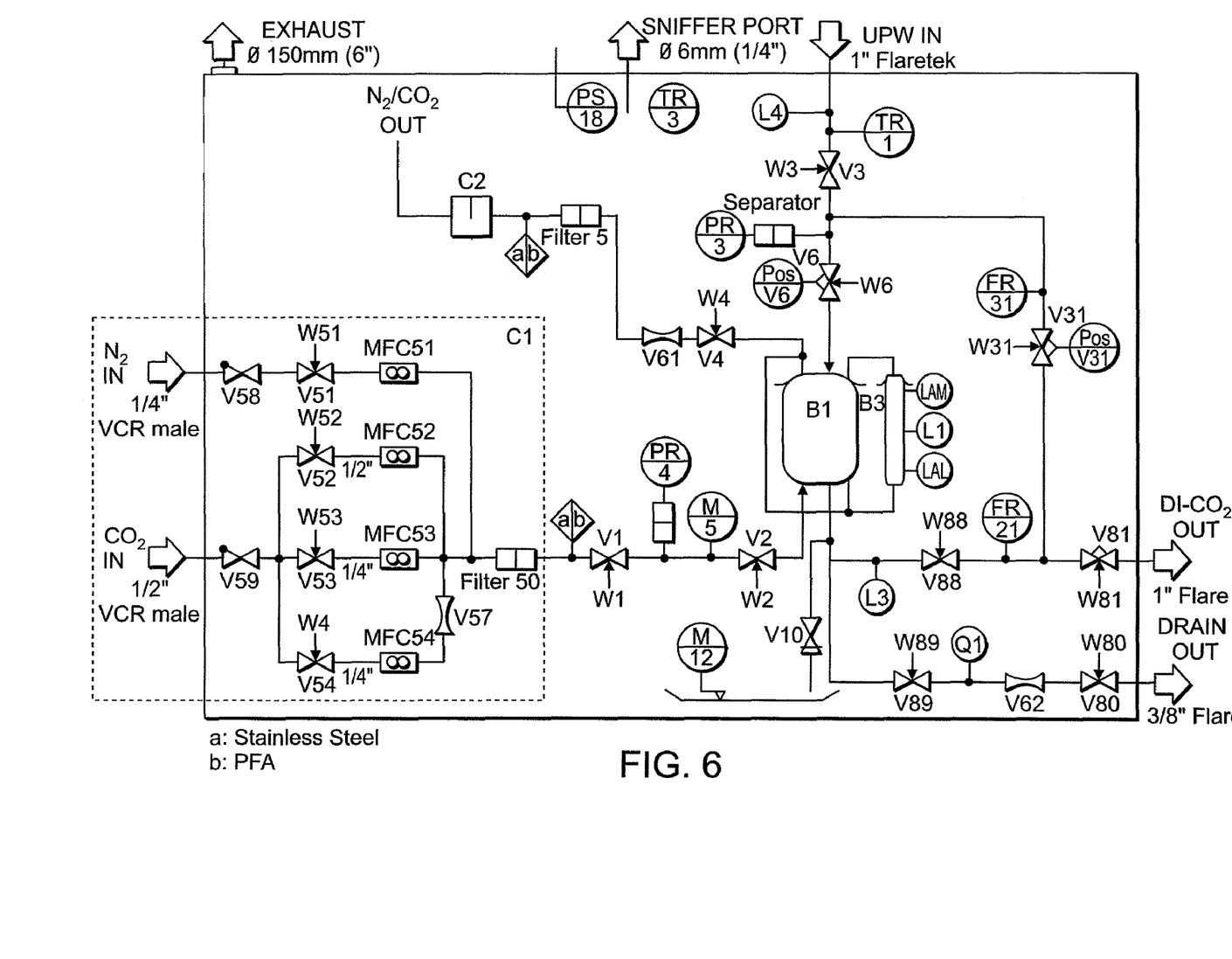
FIG. 6 is a detailed block diagram of yet another embodiment of the system for generating DI-CO2 water.

FIG. 6 shows another exemplary embodiment of a device used to carbonate ultra-pure DI water (i.e., add CO2 to the DI water). In this embodiment, gas module C1 includes two gas inlets that can be used for two separate gases such as nitrogen and CO2. As shown in FIG. 6, variable valves V52-V54, and MFCs MFC52-MFC54 are mutually connected to form a loop. A separate gas can enter the system via variable valve V51 and MFC51. The two gases can be mixed in a desired proportion prior to exiting the gas module. Contactor B1 has an outlet that can release the gases via V4 and V61. The released gases can be recycled back into the gas module if desired or be released into the atmosphere.

Contactor B1 can have a by-pass unit B3 as shown in FIG. 6. By-pass unit B3 can include sensors LAH, L1 and LAL that can control and/or monitor parameters such as flow rate, pressure and liquid level. The sensors can be in communication with the control module to allow for automatic control or can be manually controlled. An advantage of the by-pass unit is when a high volume of the DI water is required. Another advantage of the by-pass unit is when a low concentration of $CO_2$ in the DI water is desired. Yet another advantage of the by-pass unit is the speed with which the conductivity of the DI-$CO_2$ water can be changed from low volume-high conductivity to high volume-low conductivity and vice versa.

Apart from the by-pass unit B3, a high volume of DI water can also be directed via a separate line passing through valve V31 and sensor FR31 as shown in FIG. 6. This DI water can be mixed with the DI-$CO_2$ water exiting the contactor to alter the conductivity prior to exiting the system as desired.

A high volume of DI water in the range of about 20-80 L/min can be flowed through either the by-pass unit or the separate line or the combination of the two. In some embodiments, the range of the high volume of DI water can be about 32-50 L/min. In various embodiments, about 40-45 L/min of DI water can be flowed through the system.

The gas module is typically made of metals such as stainless steel. The valves, MFCs, and sensors are known to those skilled in the art and any commercially available valves, MFCs and sensors, regulators or monitors can be used. The gases and liquids typically pass through pipes or tubing made of corrosion resistant metals or metal alloys. Polymeric tubing or pipes made from PTFE, PVDF, PFA, PVC, PP, PE, ECTFE, C-PVC, etc. can also be used wherever possible.

Figure 7:
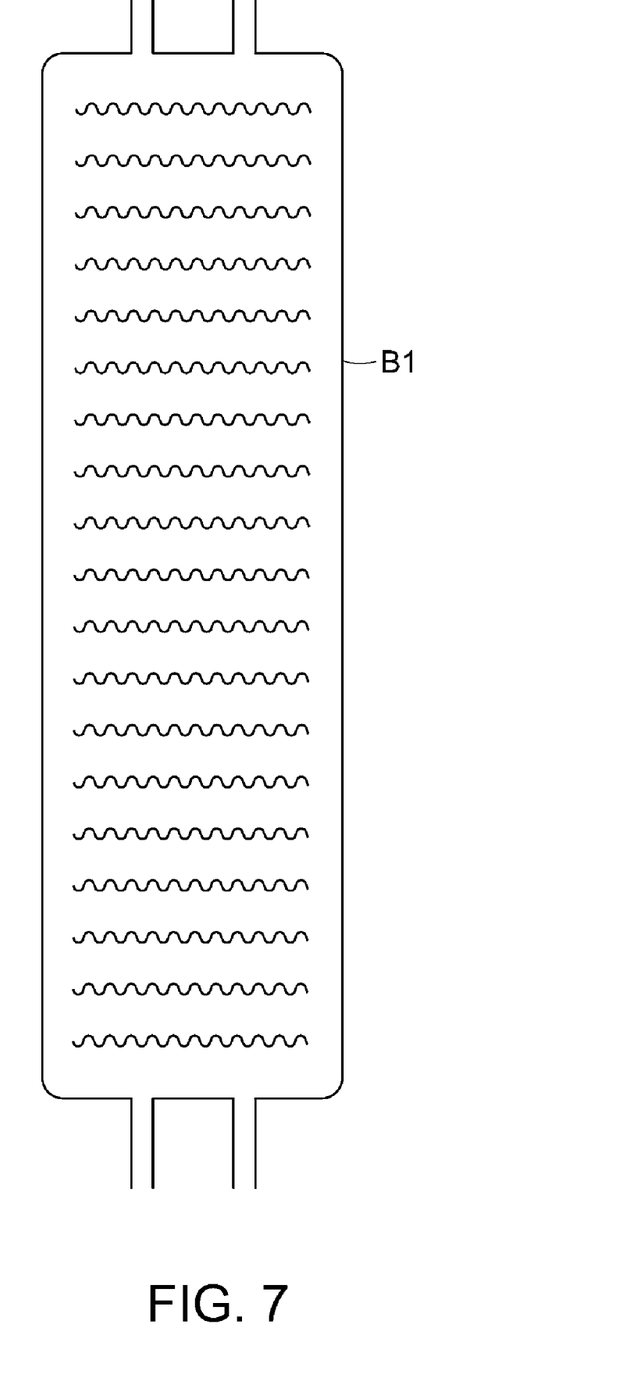
FIG. 7 is a cross-section of an embodiment of the contactor.

As shown in FIG. 7, the contactor is typically a vessel or a chamber that can withstand high pressure. It can be made either of glass or quartz or metal or metal alloys such as stainless steel, brass or polymers such as PTFE, PVDF, PFA, PVC, PP, PE, ECTFE, C-PVC, etc. In some embodiments, the contactor is made from a combination of one or more of the materials listed above.

A preferable contactor is shaped like a column and filled with "tower packing" with a high surface area per volume. Fibers made of the above mentioned polymers can be used for the tower packing. The high surface area enhances the rate of mixing of the carbon dioxide and DI water.

Figure 8:
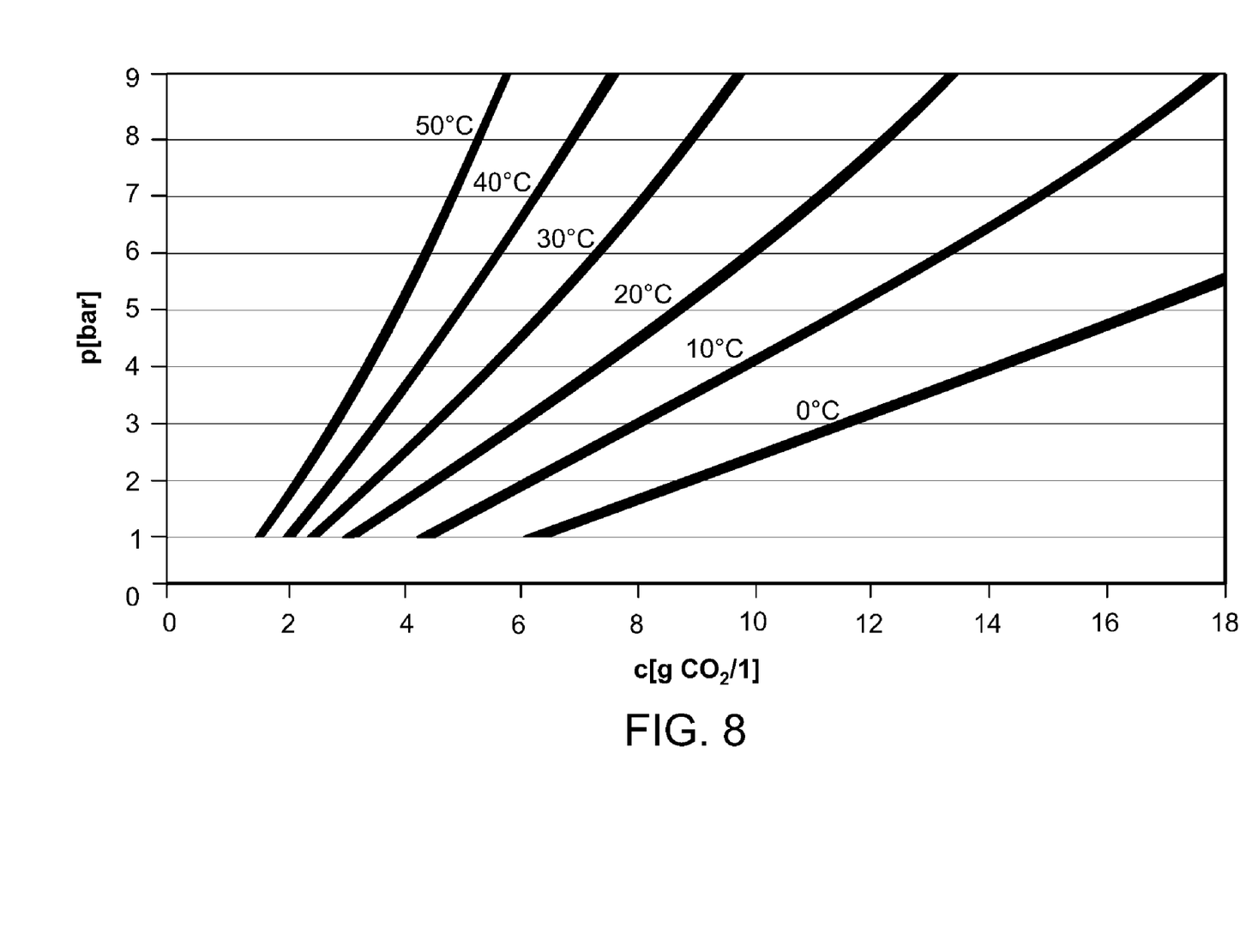
FIG. 8 is a graph showing the solubility of CO2 gas in DI water at different values of temperature and pressure.
Figure 9:
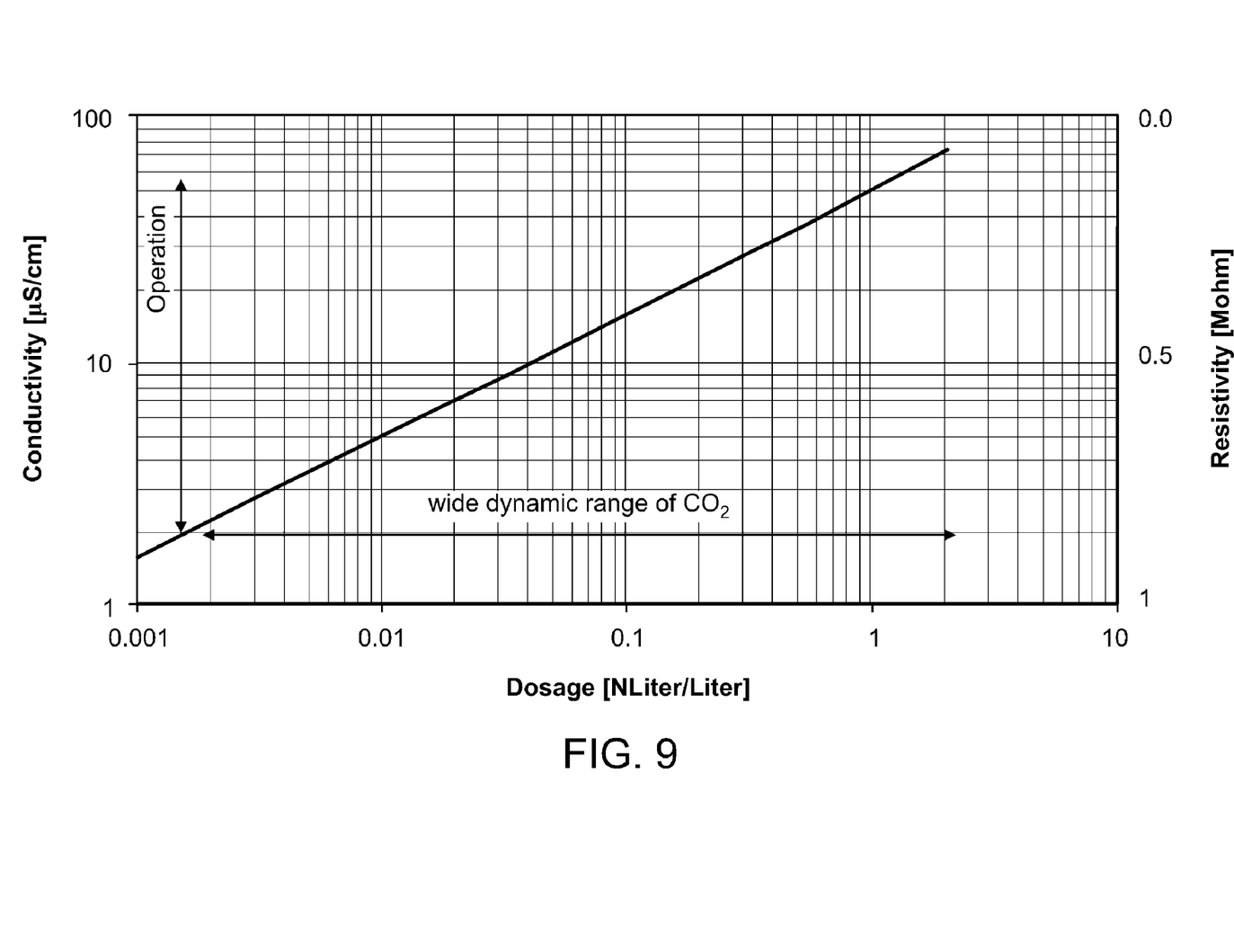
FIG. 9 is a graph of the dosage of CO2 gas per liter of DI water versus the conductivity of the DI-CO2 water.
Figure 10:
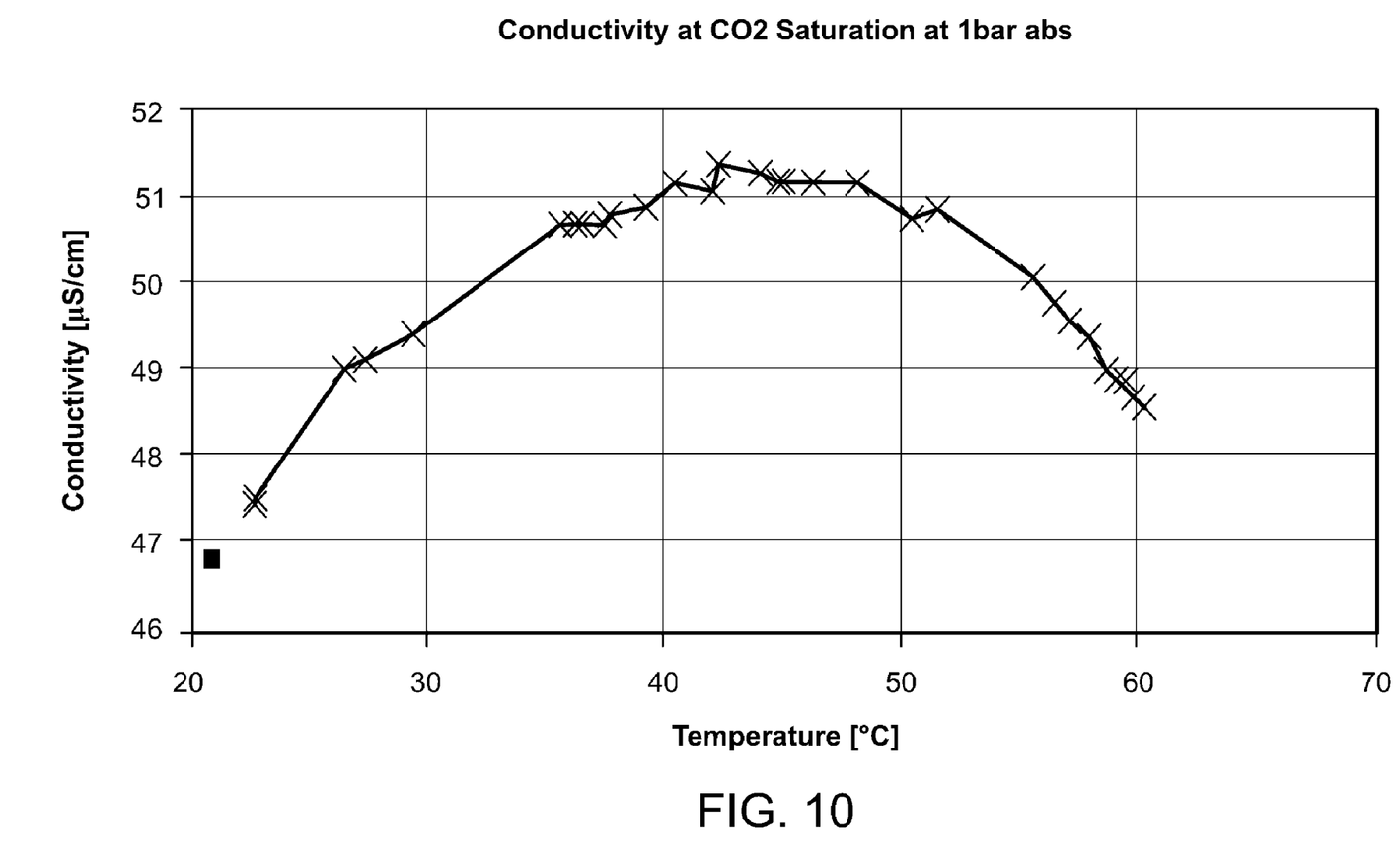
FIG. 10 is a graph of the temperature of the DI-CO2 water versus the conductivity.

The control module 125 can include stored data relating the input $CO_2$ flow rate from the gas module 110 to a specific temperature, DI-$CO_2$ water flow output, and conductivity as shown in FIGS. 8-10. FIG. 8 shows the solubility of $CO_2$ in DI water for different temperatures and pressures and FIG. 9 shows the specified conductivity range of 2-60 $\mu$S/cm lead to a very wide gas dosage range. FIG. 10 shows the correlation between the conductivity of carbonated water at different temperatures. In certain embodiments, the control module 125 can verify the desired input $CO_2$ flow rate from the data stored therein and from the temperature, conductivity, flow rate, and set point values electronically sent or entered into the control module 125. In other embodiments, the control module 125 can calculate/extrapolate the input $CO_2$ flow rate from the data stored therein in combination with the values electronically sent or entered. In certain embodiments, the control module sends an electronic signal to automatically adjust gas module 110. In various embodiments, the values calculated by the control module 125 can be used to manually adjust the parameters of gases and DI water entering and/or exiting the system 101.

In the embodiment shown in FIG. 4, conductivity measurements at Q1 are taken in a bypass line to a drain. In general, the measurements are taken in a bypass line to the drain due to metal contamination from the electrodes forming the conductivity sensor Q1. In other embodiments, it is possible to do a contamination free measurement in-line directly at the DI-$CO_2$ outlet. This may be done with special electrodes or a contact free method.

In certain embodiments, an additional pressure regulator at the DI water inlet can lead to additional stability in concentration and thus increase the advantages for usage at a connected tool. A separation of the $CO_2$ gas injection in two or more lines accordingly can be advantageous in certain DI-$CO_2$ water generation methods. For example, a small amount of defined gas used to dilute the $CO_2$ is preferable at low conductivity to avoid conductivity fluctuation caused by bubbles at the gas inlet. In various embodiments, DI water flow measurement can also be done at the water inlet.

In one embodiment, the gas control is achieved with mass-flow controllers. Due to a square relationship between the conductivity and concentration as shown in FIG. 9, a control element with such characteristics would be preferable. In another embodiment, a mechanism with switched flow restrictors and controlled pressure or a configuration with PWM (pulse wide modulation) controlled valves can be employed. For the range at very low conductivity, one option is to inject water which is already controlled enriched with $CO_2$.

The DI-$CO_2$ water generated by the present invention provides a damage free process for cleaning semiconductor devices in an electrically inert atmosphere. The dissolved $CO_2$ reduces the resistivity of the DI water to a level that prevents surface charging. It also acidifies the DI water and increases the zeta potential. The DI-$CO_2$ water allows to protect the integrity of fragile semiconductor devices. For example, the DI-$CO_2$ water can be used to dissolve, oxidize, etch, and scrub contaminants from the surface of silicon wafers. The DI-$CO_2$ water also prevents corrosion of metals during the wet-cleaning steps. The DI-$CO_2$ water can also be used in commercially available wet cleaning devices or tools as a component or as a separate delivery system.

Variations, modifications, and other implementations of what is described herein will occur to those of ordinary skill in the art without departing from the spirit and the scope of the invention. Accordingly, the invention is not to be limited only to the preceding illustrative descriptions.

What is claimed is:

1. A system for carbonation of deionized water comprising:
    a) a deionized water source;
    b) a carbon dioxide gas source;
    c) a contactor in fluid communication with the water source and the carbon dioxide gas source, the contactor generating carbonated deionized water and having an outlet for outputting the carbonated deionized water;
    d) at least one sensor in fluid communication with the outlet for measuring flow rate and temperature of the carbonated deionized water; and
    e) a feed-forward control in communication with the at least one sensor and the carbon dioxide gas source for determining an amount of carbon dioxide gas the carbon dioxide gas source supplies to the contactor such that a specific conductivity of the carbonated deionized water is generated in the contactor, wherein the determination is based on the measured flow rate and temperature.

2. The system of claim 1 further comprising at least one mass flow controller in fluid communication with the carbon dioxide gas source and the contactor for controlling the amount and flow rate of carbon dioxide gas entering the contactor.

3. The system of claim 2 further comprising:
a sensor in fluid communication with the outlet for measuring conductivity of the carbonated deionized water; and
a feedback loop in communication with the sensor and the at least one mass flow controller for adjusting the amount of carbon dioxide gas the carbon dioxide gas source provides to the contactor based on the measured conductivity, to achieve a specified conductivity of the carbonated deionized water.

4. The system of claim 2 further comprising at least four mass flow controllers.

5. The system of claim 1 further comprising a first sensor that measures the flow rate and a second sensor that measures the conductivity.

6. The system of claim 1 further comprising a processor for receiving the parameters from the at least one sensor.

7. The system of claim 1 further comprising a by-pass unit in fluid communication with the deionized water source, the contactor and the at least one sensor.

8. The system of claim 1 wherein substantially no excess carbon dioxide remains undissolved with the water in the contactor.

9. The system of claim 1 further comprising one or more valves in fluid communication with the contactor to release excess gas from the contactor.

10. The system of claim 1 wherein the contactor comprises an inlet for receiving a mixture of deionized water from the deionized water source and the carbon dioxide gas from the carbon dioxide gas source.

11. The system of claim 1 wherein the contactor comprises a first inlet for receiving deionized water from the deionized water source and a second inlet for receiving the carbon dioxide gas from the carbon dioxide gas source.

12. A method of generating carbonated deionized water comprising:
a) supplying deionized water to a contactor;
b) supplying carbon dioxide gas to the contactor;
c) sensing, with at least one sensor, flow rate and temperature of the carbonated deionized water generated in the contactor and exiting via a contactor outlet;
d) determining an amount of carbon dioxide gas to supply to the contactor such that a specific conductivity of the carbonated deionized water is generated by the contactor with a feed-forward control in communication with the at least one sensor and the supply of carbon dioxide gas, wherein the determination is based on the sensed flow rate and temperature;
e) supplying the determined amount of carbon dioxide to the contactor with the feed-forward control; and
f) flowing the carbonated deionized water of a specified conductivity from the contactor.

13. The method of claim 12 further comprising controlling flow rate and amount of carbon dioxide gas entering the contactor with at least one mass flow controller.

14. The method according to claim 13 further comprising:
sensing, with a sensor, conductivity of the carbonated deionized water generated in the contactor and exiting via a contactor outlet;
adjusting the amount of carbon dioxide gas supplied to the contactor based on the conductivity with a feedback loop in communication with the at least one sensor and the at least one mass flow controller.

15. The method of claim 13 further comprising at least four mass flow controllers.

16. The method of claim 12 further comprising a first sensor that measures the flow rate and a second sensor that measures the conductivity.

17. The method of claim 12 further comprising adjusting the conductivity of the carbonated deionized water with a by-pass unit.

18. The method of claim 12 further comprising adjusting the conductivity of the carbonated deionized water based on the parameters received by a processor.

19. The method according to claim 12 further comprising mixing carbon dioxide gas with the deionized water prior to supplying the deionized water to the contactor.

20. The method according to claim 12 wherein the conductivity of the carbonated deionized water exiting the contactor is in the range of about 2-50 uS/cm.

21. The method according to claim 12 wherein response time to change from one specified conductivity to another is less than about 5 minutes.

22. The method of claim 21 wherein the response time is less than about 1 minute.

* * * * *